United States Patent
Fink et al.

(10) Patent No.: US 7,786,402 B2
(45) Date of Patent: Aug. 31, 2010

(54) NANOSPOT WELDER AND METHOD

(75) Inventors: Richard Fink, Austin, TX (US); Zvi Yaniv, Austin, TX (US); Igor Pavlovsky, Austin, TX (US); Leif Thuesen, Austin, TX (US)

(73) Assignee: Applied Nanotech Holdings, Inc., Austin, TX (US)

( * ) Notice: Subject to any disclaimer, the term of this patent is extended or adjusted under 35 U.S.C. 154(b) by 1454 days.

(21) Appl. No.: 11/176,101

(22) Filed: Jul. 7, 2005

(65) Prior Publication Data

US 2007/0125753 A1    Jun. 7, 2007

Related U.S. Application Data

(62) Division of application No. 10/838,698, filed on May 4, 2004, now abandoned.

(60) Provisional application No. 60/469,381, filed on May 9, 2003, provisional application No. 60/508,815, filed on Oct. 3, 2003, provisional application No. 60/549,200, filed on Mar. 2, 2004.

(51) Int. Cl.
*B23K 15/00* (2006.01)

(52) U.S. Cl. ............... 219/121.14; 219/121.35; 977/855; 977/901; 427/457

(58) Field of Classification Search ............ 219/121.13, 219/121.14, 121.26, 121.34, 121.35; 977/855, 977/888, 901; 427/457
See application file for complete search history.

(56) References Cited

U.S. PATENT DOCUMENTS

| | | | | |
|---|---|---|---|---|
| 4,070,597 A | * | 1/1978 | Hughes | |
| 4,158,072 A | * | 6/1979 | Bohg et al. | ............... 430/313 |
| 4,564,736 A | * | 1/1986 | Jones et al. | ............... 219/121.6 |
| 5,394,388 A | * | 2/1995 | Hatanaka | |
| 5,591,312 A | * | 1/1997 | Smalley | ............... 204/157.41 |
| 5,773,921 A | | 6/1998 | Keesmann et al. | ............... 313/309 |
| 6,146,227 A | | 11/2000 | Mancevski | ............... 445/24 |
| 6,411,020 B1 | | 6/2002 | Yaniv et al. | ............... 313/310 |
| 6,528,785 B1 | * | 3/2003 | Nakayama | |
| 6,660,959 B2 | | 12/2003 | Vallance et al. | ............... 219/121.18 |
| 6,669,256 B2 | * | 12/2003 | Nakayama | |
| 6,709,566 B2 | * | 3/2004 | Cumings | |

(Continued)

FOREIGN PATENT DOCUMENTS

WO    WO 00/79558    12/2000

(Continued)

OTHER PUBLICATIONS

Hirayama et al, "Nanospot welding of carbon nanotubes", Applied Physics Letters, vol. 79, No. 8, Aug. 20, 2001.*

(Continued)

*Primary Examiner*—Samuel M Heinrich
(74) *Attorney, Agent, or Firm*—Kelly Kordzik; Matheson Keys Garsson & Kordzik PLLC

(57) ABSTRACT

A method and apparatus for assembly of small structures is disclosed. The present invention discloses electron beams created from one or more nanotips in an array operated in a field emission mode that can be controlled to apply heat to very well defined spots. The multiple electron beams may be generated and deflected and applied to electron beam heating and welding applications.

13 Claims, 13 Drawing Sheets

U.S. PATENT DOCUMENTS

| | | | |
|---|---|---|---|
| 6,840,835 B1 * | 1/2005 | Tuck | |
| 6,874,668 B2 * | 4/2005 | Cumings | |
| 6,918,982 B2 * | 7/2005 | Afzali-Ardakani et al. | 156/230 |
| 7,045,947 B2 * | 5/2006 | Van Der Vaart et al. | 313/495 |
| 7,441,444 B2 * | 10/2008 | Hoh | |
| 2002/0053522 A1 * | 5/2002 | Cumings | |
| 2002/0053867 A1 | 5/2002 | Van Der Vaart et al. | 313/446 |
| 2002/0074317 A1 * | 6/2002 | Johnson | 219/121.14 |
| 2002/0122766 A1 * | 9/2002 | Lieber et al. | 423/447.3 |
| 2003/0135971 A1 * | 7/2003 | Liberman | |
| 2003/0189351 A1 * | 10/2003 | Nakayama et al. | 294/99.1 |
| 2004/0113621 A1 * | 6/2004 | Naughton | |
| 2004/0128016 A1 * | 7/2004 | Stewart | 700/159 |
| 2005/0081363 A1 * | 4/2005 | Malshe | |
| 2006/0057383 A1 * | 3/2006 | Cumings et al. | 428/403 |
| 2006/0205109 A1 * | 9/2006 | Cox | |
| 2006/0273356 A1 * | 12/2006 | Matsumoto et al. | 257/253 |

FOREIGN PATENT DOCUMENTS

| | | |
|---|---|---|
| WO | WO 01/26131 | 4/2001 |

OTHER PUBLICATIONS

David S. Y. Hsu, "Microgating carbon nanotube field emitters by in situ growth inside open aperture arrays," *Applied Physics Letters*, vol. 80, No. 16, Apr. 22, 2002, pp. 2988-2990.

D. R. Whaley et al., "Application of Field Emitter Arrays to Microwave Power Amplifiers," International Vacuum Electronics Conference May 2-4, 2000, sponsored by IEEE Electron Devices Society, p. 9.1 (3 total pages).

Extreme Devices, "E-Chip™ ED138-250 Integrated Gate Field Emission Electron Source," Mar. 2003—Rev. 2, pp. 1-4.

K. Konuma et al., "Field Emitter Array Cathode-Ray Tube (FEA-CRT)," *SID 99 Digest*, 1999, pp. 1150-1153.

David S. Y. Hsu, "Integrally gated carbon nanotube-on-post field emitter arrays," *Applied Physics Letters*, vol. 80, No. 1, Jan. 7, 2002, pp. 118-120.

W. Zhu et al., "Large current density from carbon nanotube field emitters," *Applied Physics Letters*, vol. 75, No. 6, Aug. 9, 1999, pp. 873-875.

Chris Bower et al, "A Micromachined Vacuum Triode Using a Carbon Nanotube Cold Cathode," *IEEE Transactions on Electron Devices*, vol. 49, No. 8, Aug. 2002, pp. 1478-1483.

P. J. A. Derks et al., "54.2: Technology for the Hopping Electron Cathode," *SID 02 Digest*, 2002, pp. 1396-1399.

Jean-Marc Bonard et al., "Tuning the Field Emission Properties of Patterned Carbon Nanotube Films," *Advanced Materials*, vol. 13, No. 3, Feb. 5, 2001, pp. 184-188.

Nijs C. Van Der Vaart et al., "A Novel Electron Source for CRTs," *Information Display 6/02*, SID 2002, pp. 14-17.

T.R. Groves et al., "Distributed, Multiple Variable Shaped Electron Beam Column for High Throughput Maskless Lithography," *J. Vac. Sci. Technol.*, B 16(6), Nov./Dec. 1998, pp. 3168-3173.

S.D. Johnson et al., "Carbon Nanotips for Field-Emission Electron Guns," Abstracts of the 47$^{th}$ International Conference on Electron, Ion and Photon Beam Technology and Nanofabrication, Tampa, Florida, May 27-May 30, 2003, pp. 274-275.

N. C. Van Der Vaart et al., "A Novel Cathode for CRTs based on Hopping Electron Transport," *SID 02 Digest*, 2002, pp. 1392-1395.

\* cited by examiner

NANOSPOT WELDER AND METHOD

CROSS-REFERENCE TO RELATED APPLICATIONS

The present invention claims priority to the following:

Provisional Patent Application Ser. No. 60/469,381, entitled "CARBON NANOTUBE HIGH CURRENT DENSITY ELECTRON SOURCE," filed on May 9, 2003;

Provisional Patent Application Ser. No. 60/508,815, entitled "NANOSPOT WELDER AND METHOD," filed on Oct. 3, 2003; and Provisional Patent Application Ser. No. 60/549,200, entitled "NANOSPOT WELDER AND METHOD FIELD OF THE INVENTION," filed on Mar. 2, 2004.

TECHNICAL FIELD

The present invention relates in general to the creation of weld joints in small structures.

BACKGROUND INFORMATION

1. Electron Sources

Researchers have been working on developing electron sources using carbon nanotubes (CNTs) for about ten years. One of the earliest references to this work is the patent of Keesmann et al. (U.S. Pat. No. 5,773,921). Some examples of the applications of using CNT electron sources are for displays (field emission displays and cathode ray tubes are two examples), e-beam lithography, x-ray sources and microwave devices (traveling wave tubes, klystrons, magnetrons, etc.). Some of these applications require high currents and high current densities, in the range of 1-100 Amps/$cm^2$, in both pulsed and continuous wave (CW) or direct current (DC) modes. Many of these applications requiring high current densities are now being met using hot (thermal) cathodes of various types. All of these hot cathodes require power to heat the cathode and maintain its temperature in the range of 1000° C.

Other cold cathode technologies exist, but many of these require fabricating arrays of micron-size microtips. These are expensive to fabricate and not very reliable in extreme environments. This is evidenced by the fact that several companies that have made an effort to make microtip-based field emission displays have recently abandoned their efforts. Trying to incorporate microtip cathodes into microwave and x-ray devices has also met with limited success. On the other hand, carbon nanotube electron sources have been made with very inexpensive processes (such as printing or dispensing) over large areas.

Gated microtip electron sources, despite their weaknesses, did have an advantage of generating high current densities. (SRI International claimed 11.6 Amps/$cm^2$ at 250V, "Application of Field Emitter Arrays to Microwave Power Amplifiers," D. R. Whaley et al., Abstracts of the International Vacuum Electronics Conf, May 2-4, 2000, Monterey, Calif.; NEC Corporation claimed 1.27 Amps/$cm^2$ from a Si microtip gated device "Field-Emitter-Array Cathode-Ray-Tube (FEA-CRT)," K. Konuma et al., SID 99 Digest p. 1151, 1999; Extreme Devices claimed 4 Amps/$cm^2$ using what they claim as "diamond cathode technology," Spec sheet for E-Chip ED138-250 dated March 2003—Rev. 2; see also "A Micromachined Vacuum Triode Using a Carbon Nanotube Cold Cathode," C. Bower, et al., IEEE Trans on Electron Devices, Vol. 49, No. 8, p. 1478, August, 2002.)

The literature of carbon nanotube electron sources has examples of achievement of a few Amps/$cm^2$. (E.g., claim of 4 Amp/$cm^2$ with total current of only 0.4 mA in "Large current density from carbon nanotube field emitters," W. Zhu et al., App. Phys. Let. Vol. 75, No. 6, p. 873, August, 1999.) Most of these claims were sources operated in a diode mode (ungated, anode and cathode only) and thus are of limited use for the applications of interest. What is needed is a gated electron source using carbon nanotube cathodes that can achieve high current densities. Some attempts have been made to make a gated source using carbon nanotubes (one example is D. S. Y. Hsu, et al., "Integrally Gated Carbon Nanotube-on-Post Field Emitter Arrays", App. Phys. Lett., Vol. 80., p 118, 2002). The best that has been achieved is on the order of 0.1 Amps/$cm^2$.

There are a couple of reasons why gated, high current density electron sources have not been made. The CNT cathodes are not regular arrays of nanotubes that are positioned in an exact formation and aligned in an exact direction. Instead, they are irregularly positioned and randomly oriented. In some cases, the alignment is preferential in a certain direction; but, unless the position and the alignment of the CNTs are engineered precisely, it will be difficult to design and engineer an optimized gated structure such as is done for microtip sources. The lack of optimization leads to poor efficiency of the emitted electrons (many of them strike the gate structure, creating heat that will ultimately lead to device destruction) and poor use of cathode area (much of the area is dedicated to gate structure and not CNT emitters). Many of the carbon nanotubes are also not optimized for high current electron emission. They can unravel or become hot and disintegrate. Increasing the density of carbon nanotubes is not a solution either because they electrically screen each other from the applied electric field needed to extract the electrons from the nanotubes (see Jean Marc Bonard et al. "Tuning the Field Emission Properties of Patterned Carbon Nanotube Films," *Advanced Materials*, 13, 184 (2001)). Thus, there is a need to increase the means of increasing the current density of gated electron emission devices using CNT cathodes.

One means of increasing the current density is to use an approach that is similar to what van der Vaart et al. have described in U.S. Patent Application Publication US 2002/0053867 A1 (see also International Publication Number WO 00/79558 A1). This approach is also described in papers published in the SID literature ("Technology for the Hopping Electron Cathode," P. J. A. Derks, et al., SID 02 Digest, p. 1396; "A Novel Cathode for the CRTs based on Hopping Electron Transport," N. C. van der Vaart," SID 02 Digest, p. 1392; "A Novel Electron Source for CRTs," van der Vaart et al., Information Display, Vol. 18, No. 6, p. 14, June 2002).

In this Hopping Electron Cathode (HEC) approach, the electrons from a thermal cathode are "condensed" by a funnel-shaped structure that is coated with a layer of secondary electron emitter material. FIG. 1 illustrates how this approach works. The electrons from a hot cathode are extracted by use of a gauss electrode (grid) from the cathode and then strike the funnel. Secondary electrons are generated when the voltage of the electrode at the top of the funnel is sufficiently high enough (about 300-500V). Because the funnel surface is insulating and charge conservation must be maintained, the current is neither amplified nor degraded, but collected by the funnel to the opening at the end of the funnel. Using this approach, very high electron current densities can be emitted from the funnel opening, exceeding 1000 Amps/$cm^2$.

2. Welding

With smaller and smaller structures and assemblies required for many applications, there is a need for assembly and welding technologies for the smaller structures. As just one example, there is a need for welding fine hydrogen separation membranes into very small reactors (micro-reactors). There is also a need for heat treatment on a fine scale and with high resolution. High throughput is also required for product manufacturing. There are several methods for welding two pieces of material together.

Contact welding (tack welding)—This involves forcing high current in a short pulse though the two parts. Typically, the joint between the two parts is highly resistive compared to the bulk of the materials and this area is heated rapidly by the pulse current. The temperature can rise to near or over the melting point of one or more of the materials and a bond is created between the materials. Typically, the size scale for this type of welding is on the order of 1 mm or larger. In this case, both parts must be metallic.

Wire bonding—Wire bonding is similar to contact welding. Ultra-sound can be applied in addition to high pulse current to create a bond. The size scale is on the order of 0.1 mm and can be highly automated. This is good for making interconnects to integrated circuits and printed circuit boards, but limited in making other assemblies.

Laser bonding—A laser can be focused to a small spot and create local heating to make a bond. Mirrors on micropositioners can direct the beam to many different spots. This approach is flexible but it is difficult to make a multibeam system to increase the throughput. In addition, metals reflect a large percentage of the light, decreasing the efficiency of the welder. The size of the spot is on the order of 0.1 mm to 0.01 mm.

Focused Ion Beam (FIB)—FIB systems are much like scanning electron microscopes (SEMs). FIBs can focus a beam to nano-scale sizes; 10 nanometer features have been demonstrated. This approach can achieve the fine resolution required for many applications, but FIB machines are expensive systems and the throughput is very low because only one beam is available to do all the machining. FIB systems are typically used for micromachining by etching material away and are not used for welding.

Electron beam welders or Scanning Electron Microscopes (SEMs)—Electron beam welders use a electron gun to weld joints in a vacuum environment Typically, the focus of the electron beam is 0.1 mm to 1.0 mm. SEMs can focus to much finer resolutions, but typically have very small currents, not sufficient for welding or bonding. Both systems use only one beam to perform all the processes. The size of the beam (welding spot) and the through put of standard electron beam welders and SEM machines are not sufficient for many nanospot welding and heat treatment applications. An e-beam welder is needed that can be sealed to an array for multibeam approaches and also achieve small beam sizes.

It is therefore a desire to provide a nanospot welder and method that addresses the need for assembly apparatus and methods for very small structures.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

In the following description, numerous specific details are set forth such as specific display configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Figure 1:
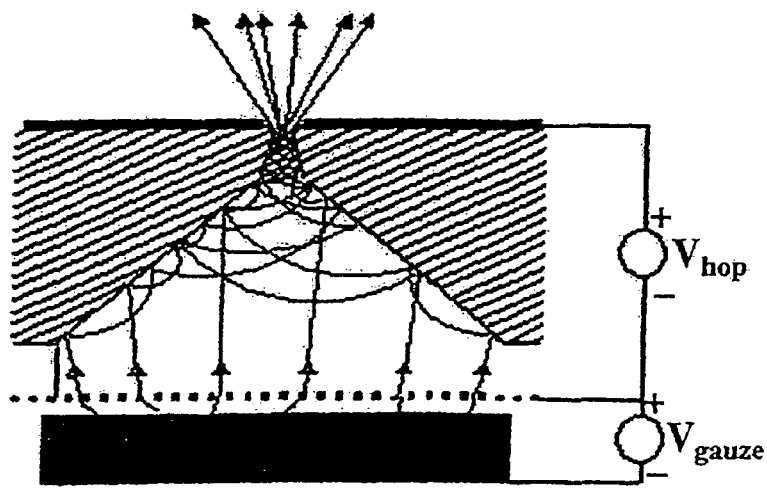
FIG. 1 illustrates a prior art hopping electron cathode (HEC)
Figure 2:
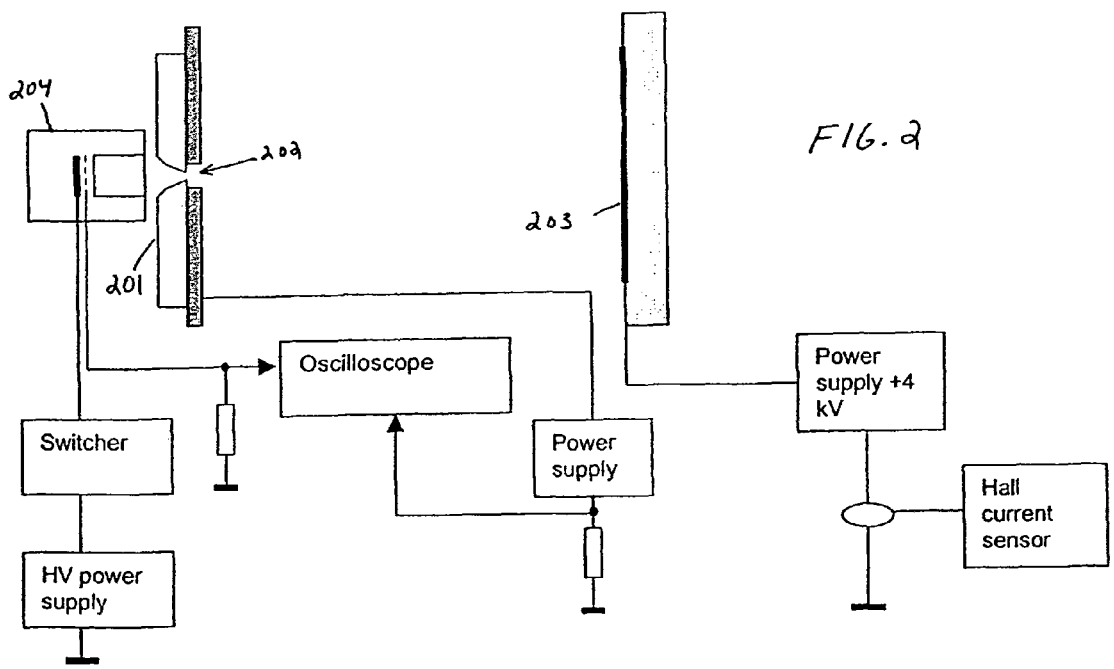
FIG. 2 illustrates a gated HEC.

Referring to FIG. 2, the funnel is two blades of alumina 201 that are shaped to form a slit funnel. A cylindrical funnel can also be used, such as described in the Philips papers.

Figure 3:
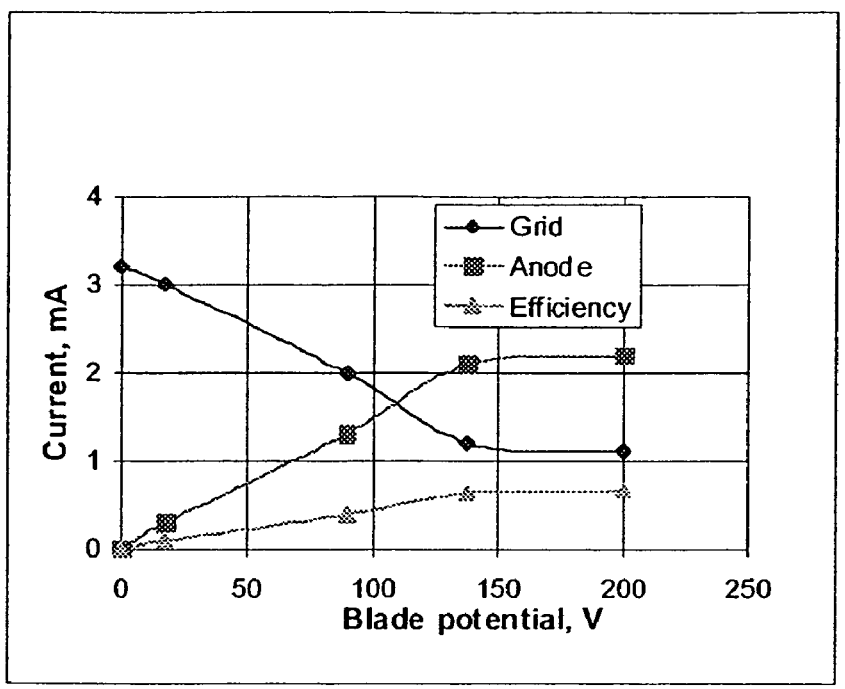
FIG. 3 illustrates a graph of current versus hopping electron blades potential.

FIG. 3 shows the efficiency of the HEC 204 vs. the blades 201 potential. The prior art literature mentions the potential on the funnel electrodes of nearly 500-700V is needed. However, it is seen that the potential of 150-200V is good enough to force the electrons to come out from the slit 202. The efficiency of the source (the ratio of emitted current from the cathode 204 to the current collected at the anode 203) increased from 0 to about 67% when the potential on the funnel electrode was increased. The beam image on the phosphor screen 203 also changed: from a small single spot at low voltage to a two-lobe structure at higher voltage on the blades.

It should be noted that the current in the blade electrodes 201 was much lower then the grid and anode currents. Furthermore, the anode current can be modulated with the bias on the funnel electrode. The modulation is linear with funnel potential from 0V to about 140V. Additional experiments showed that this modulation potential from 0 to 100% swing is roughly independent of the current that is delivered from the cathode/grid assembly (e-gun). In other words, the graph shows that the 140V swing on the potential will modulate the current from the electron gun from 0 to 2.2 mA. If the grid voltage on the electron gun was increased, then the electron gun would be capable of emitting higher currents (the grid current at 0V on the funnel electrode would be higher) and the anode current with 140V on the funnel electrode would also be proportionally higher.

In FIG. 3, at zero potential on the funnel electrode, the entire cathode current goes to the extraction grid. As the funnel electrode potential (HEC blade potential) increases, more of the emitted current is condensed and passes through the funnel 202 and is then collected by the anode 203. Efficiency is the ratio of the anode current to the total current emitted from the cathode 204 and is plotted as a fraction 100%=1.0 in the graph.

Figure 4:
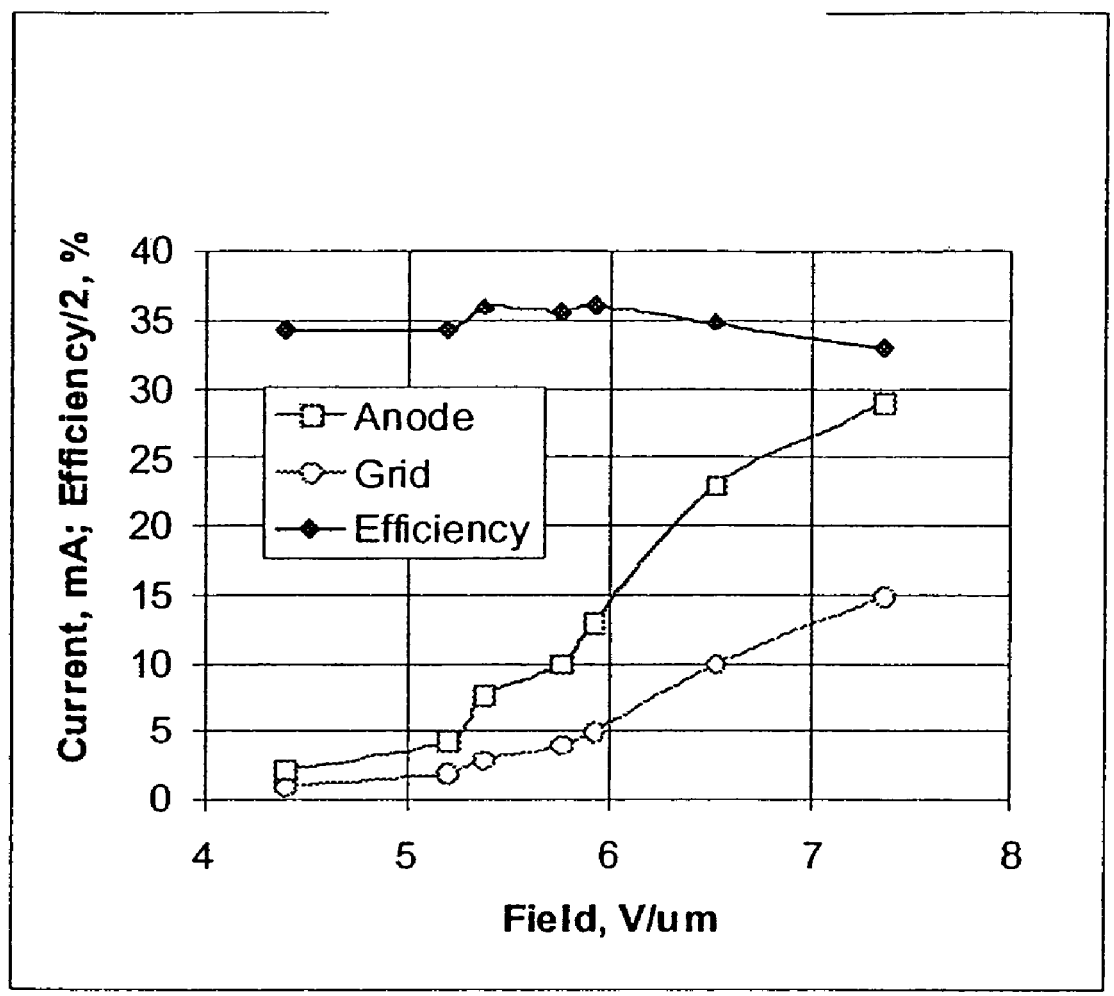
FIG. 4 illustrates anode and grid currents allotted as a function of an extraction field.

The graph in FIG. 4 measures the I-V curve at constant voltage on the funnel electrode. The objective of this task is to obtain a peak anode current of ~25 mA in a pulse mode. The pulse width was 10 μs, frequency 100 Hz, ballast resistor of 25 kOhm in series with the phosphor anode. The potential on the funnel electrodes was held at 500V constant and the extraction grid voltage in the electron gun 204 was ramped up.

In FIG. 4, the anode 203 and grid currents are plotted as a function of the extraction field generated between the cathode and the grid 204. The funnel electrode 201 potentials were held constant at 500V. Efficiency is also plotted as the percentage of total emitted current from the cathode collected at the anode. A value of 35 on the plot corresponds to 70% efficiency.

This shows that the current through the funnel 202 and collected at the anode 203 is about 30 mA. Since the gap 202 in the funnel is only 0.005 cm×0.4 cm, then the current density of electrodes flowing through the gap is about 15 Amps/cm$^2$. The current along the length of the slit 202 is not uniform, the current in the center is much higher because the electron gun source is round and not rectangular. Thus the current density in the center of the slit 202 is probably 30 Amps/cm$^2$ or higher.

A method of overcoming the inherent current density limitations of gated electron sources is performed using carbon nanotube emitters by condensing the beam from a CNT gated electron source into a narrower beam of electrons. Current densities as high as 15 Amps/cm$^2$ were demonstrated. By making the funnel a cylindrical funnel and not the slit, it is expected that current densities as high as 1000 Amp/cm$^2$ can be achieved. This current can be modulated with voltages between 0 and 150V; the current modulation is linear in proportion to the potential on the funnel electrode. This was demonstrated by operating a test circuit as shown in FIG. 2 in a pulsed mode (duty factor of 0.1%). Similar performance is expected with operating in a CW or DC mode.

Figure 5:
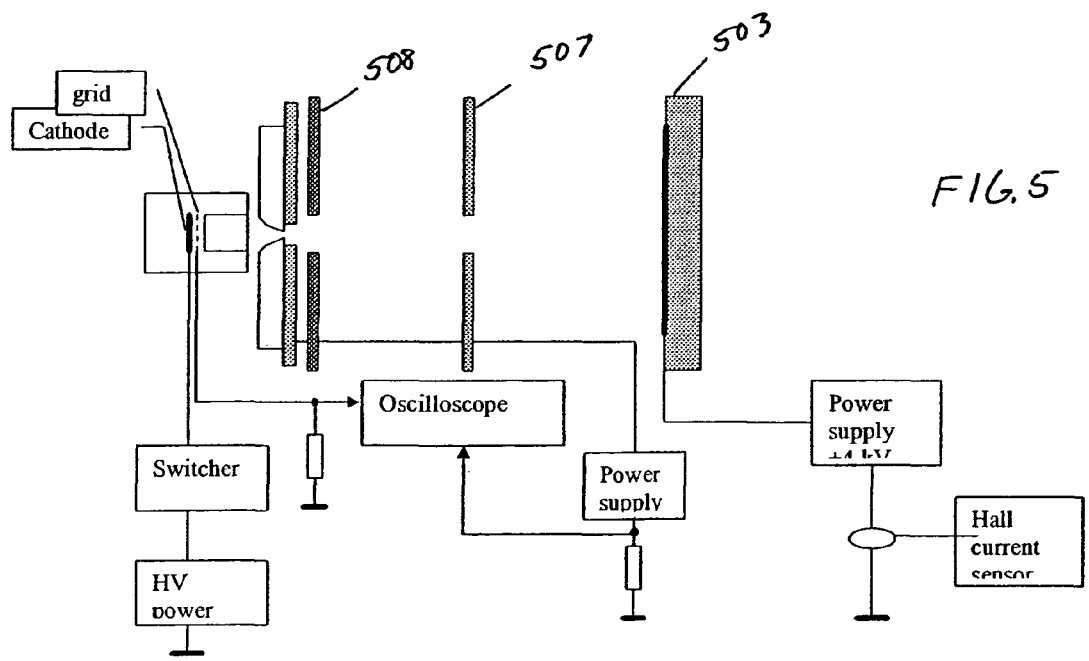
FIG. 5 illustrates a HEC with electrostatic focusing elements.

The beam coming from the funnel can be accelerated, focused with electrostatic or magnetic focusing elements or deflected using electrostatic or magnetic deflection elements similar to what is used in standard CRT electron guns. FIG. 5 shows how the electrostatic focusing lens 507, 508 can be used to focus the electrons coming through the funnel.

Figure 6:
FIG. 6 illustrates an image created by an electron beam using the embodiment illustrated in FIG. 5.

FIG. 6 shows an image on anode 503 where the beam can indeed be focused to a narrow beam using the focusing elements 507, 508.

Figure 7:
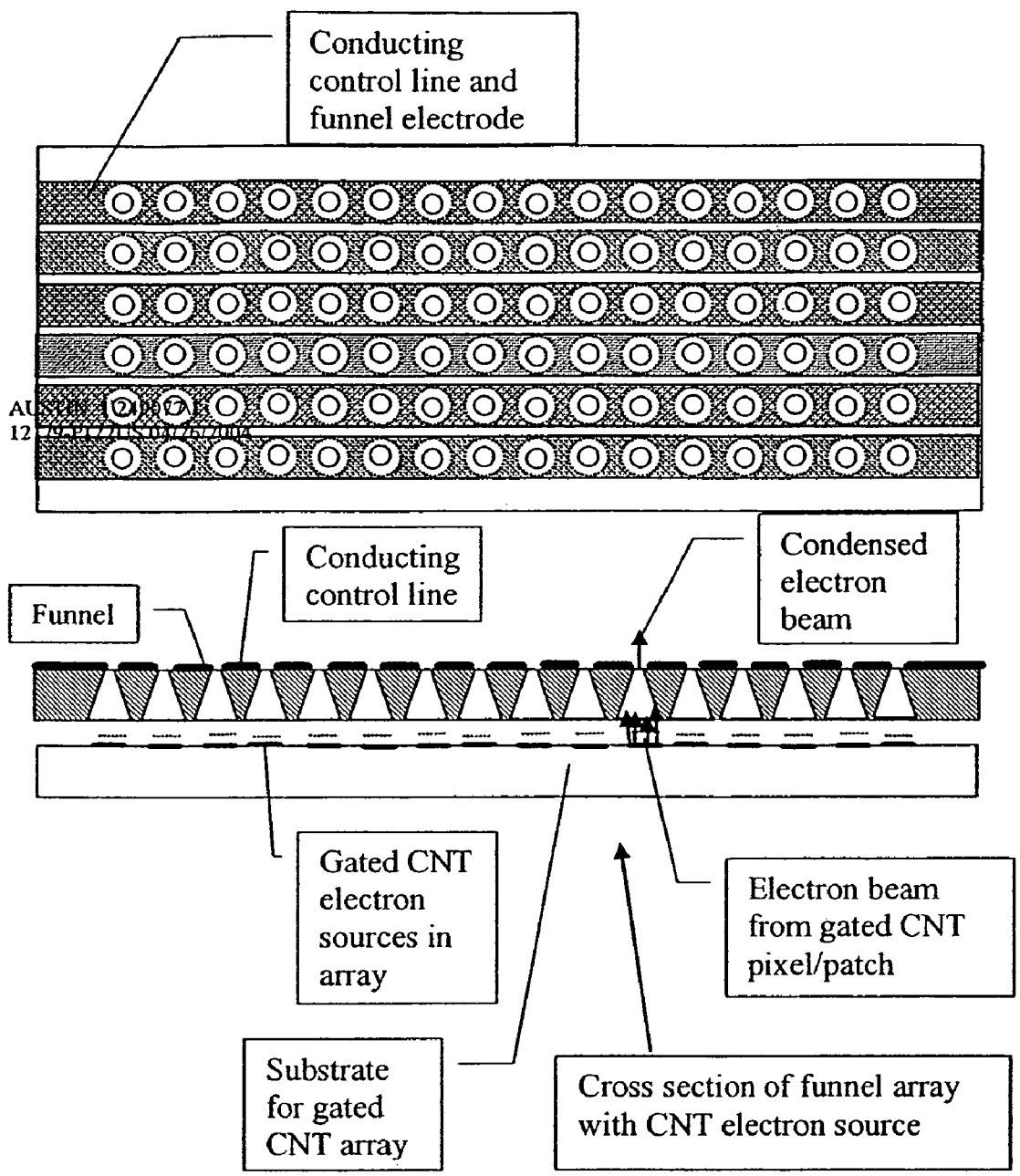
FIG. 7 illustrates an array of HEC sources.
Figure 16:
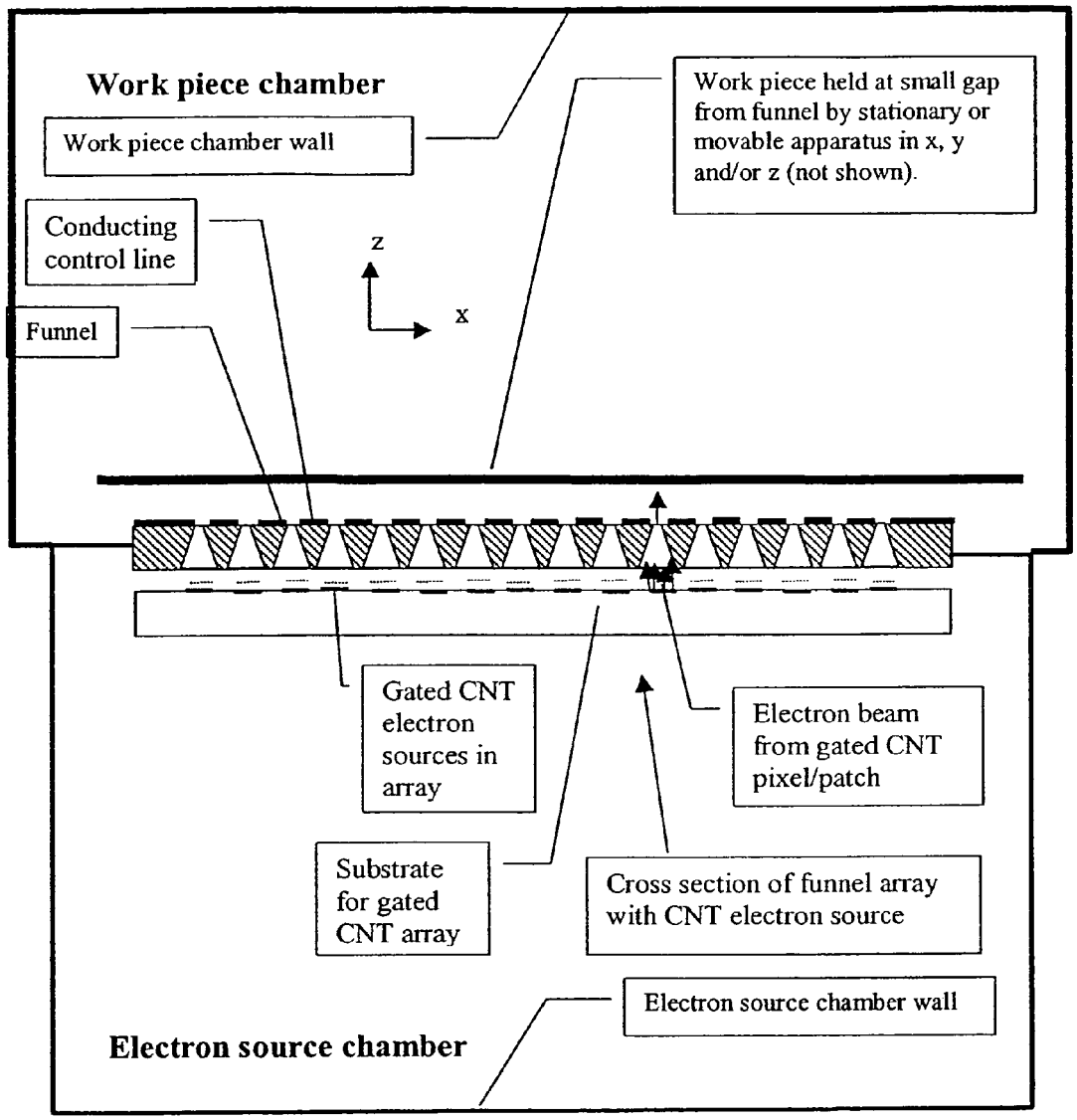
FIG. 16 is an image of an array of HEC sources and a work piece isolated in two separate chambers by the funnel array of the HEC source.

Referring to FIG. 7, it is also possible to make an integrated array of funnels for pixilated electron sources. This array can be x-y addressable. This can be done in a couple of ways. The electron sources before the funnel can be x-y addressed or a control line that also acts as the funnel electrode can be patterned on the exit side of the funnel array. The funnel array can be made out of alumina, glass or other insulator. It can be coated with MgO in the funnel openings to improve the secondary electron performance of the funnel. The funnel exit holes can be circular, rectangular or other shapes. The funnel array can then be placed on a patterned electron source (a CNT source is illustrated, but the source can be microtips, a thermal cathode, or other sources), the pattern of the electron source aligning with the openings (large end) of the funnel. Each funnel in the array condenses the electrons that enter it from the large opening. An unpatterned electron source may also be used if a flood of electrons is needed It is also possible to make just a linear array of sources, similar to what is shown in FIG. 7, but aligned only in one row. Each of these sources can be independently controlled in intensity. The focus and deflection of the each of the sources can be together (in tandem) or separately. The openings of the sources can be as small as 0.5 microns for fine-focus x-ray sources or multibeam e-beam lithography applications. Display applications can have much larger dimensions. The hopping electron cathode or funnel approach also has the advantage in that the work piece and the electron source can be isolated from each other by the funnel array. The holes of the funnel can be made very small (as small as 0.5 micron as noted earlier) so the opening area through the funnel array to the electron sources can be a very small percentage of the total array area. Gasses created in the work area where the electrons hit the work piece can be blocked from entering the area of the electron sources, increasing the stability and life of the electron sources. FIG. 16 shows the work piece in a separate chamber from the electron sources, separated by the funnel array. (The funnel array can have as few as one funnel in principle.) Different vacuum or gas environments can be placed in each of the chambers. For example, a strong vacuum pump (not shown in FIG. 16) can be used to evacuate the electron source chamber to a better vacuum than the work piece chamber (e.g. $10^{-7}$ Torr in electron source chamber and $10^{-3}$ Torr in work piece chamber). Different gas environments can also be used to in the work piece chamber than in the electron source chamber. For example, a high partial pressure of Ar gas can be used in the work piece chamber and a high partial pressure of $H_2$ gas can be used in the electron source chamber. Other gasses and arrangements are also possible. The small openings of the funnel will allow some gases to mix between the chambers but this will be limited by the size of the openings and to a smaller degree by the shape of the funnel. Small funnel openings and long, narrow funnels will limit the gas mixing between the two chambers.

The work piece is show in FIG. 16 without any support. In fact, supports will be needed to control the gap (z direction) between the funnel and the work piece and also to allow the work piece to move laterally with respect to the funnel (x and y, y is out of the paper). These supports are not shown to simplify the figure, these supports are well known in the state of the art.

Figure 8:
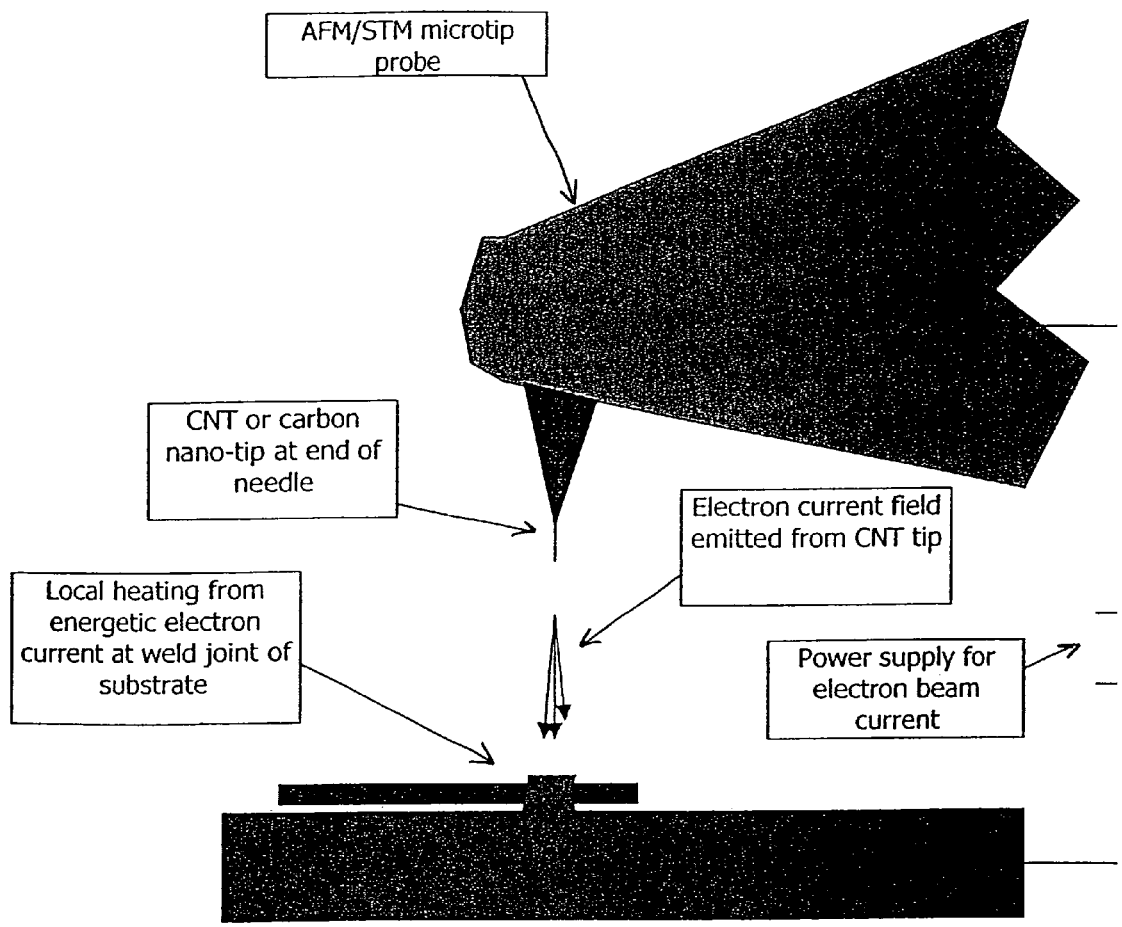
FIG. 8 is a representative view of a nanospot welder.

FIG. 8 is a representative view of a nanospot welder in accordance with an embodiment of the present invention. The nanospot welder includes a modified Atomic Force Microscope (AFM) or a Scanning Tunneling Microscope (STM) machine to make a beam of electrons that are accelerated at high energy in a beam to heat a small spot. Atomic Force Microscopes and Scanning Tunneling Microscopes are also described under the term Scanning Probe Microscopes (SPM). The AFM or STM tip is not in contact with the work piece during the welding process. The tip is operated in a field emission (FE) mode such that electrons are extracted from the tip. The electrons are accelerated to the work piece to locally heat and bond material. The tip may remain stationary during the bonding process or it can be scanning. Before the bonding process, the tip may be used in a AFM or STM mode to locate the bond site accurately. When the bond site is located, the tip may be withdrawn to a distance and operated in a field emission mode.

The expected operating mode of this device would be to place the welder tip a small distance away from the sample. These gap distances are on the order of 10 nm to as large as 100 microns, depending on the spot size of the beam required and how much voltage one would like to put on the welder tip. Since the device operates in a diode mode (no gate structure), the beam current, welder tip voltage and gap are variables that are interdependent. If the gap is 100 microns, then 1000V could be placed on the welder tip to draw about 2 micro-Amps of current from the tip to the work piece. This creates a beam power of 2 mWatts and a local power density of 100 Watts/cm2 for a spot size expected to be about 50 microns in diameter. These numbers are estimates and serve only as a description of the expected mode of operation. Smaller gaps may lead to lower voltage on the needle, but in turn may lead to smaller spot size. Even though the total power in the beam may decrease, the power density may not change nearly as much.

Figure 9:
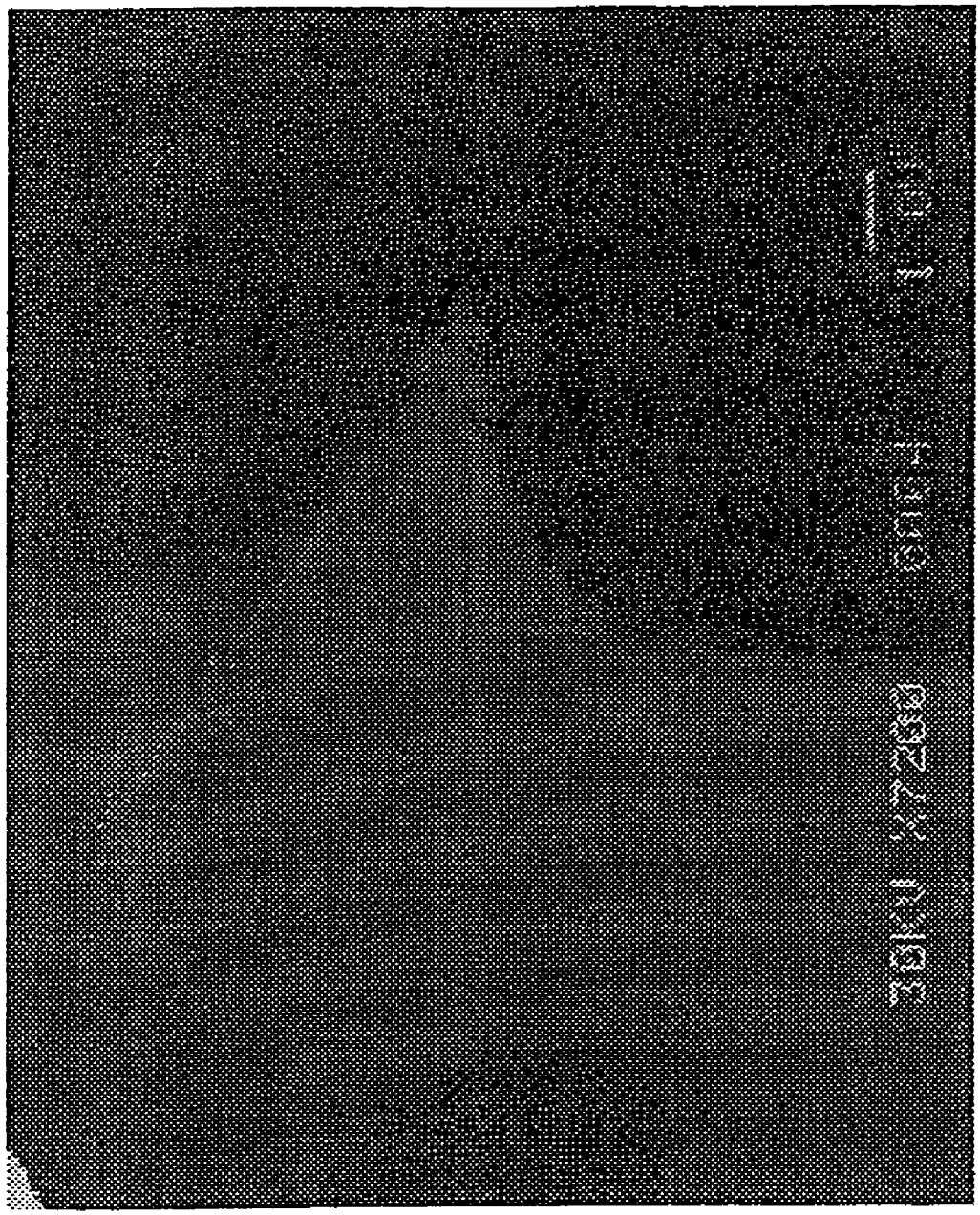
FIG. 9 is an image of a CNT fiber on the end of an AFM tip.

The tip can be coated with a carbon film to increase durability. The tip may be a carbon-based microtip. Tips made of alloys or compounds of carbon are also good for this application. A carbon nanotube fiber can be grown from the tip end of the microtip as described in (U.S. Pat. No. 5,773,921). An image of a CNT fiber grown on the end of an AFM tip is shown in U.S. Pat. No. 6,146,227 and included as FIG. 9.

Figure 10:
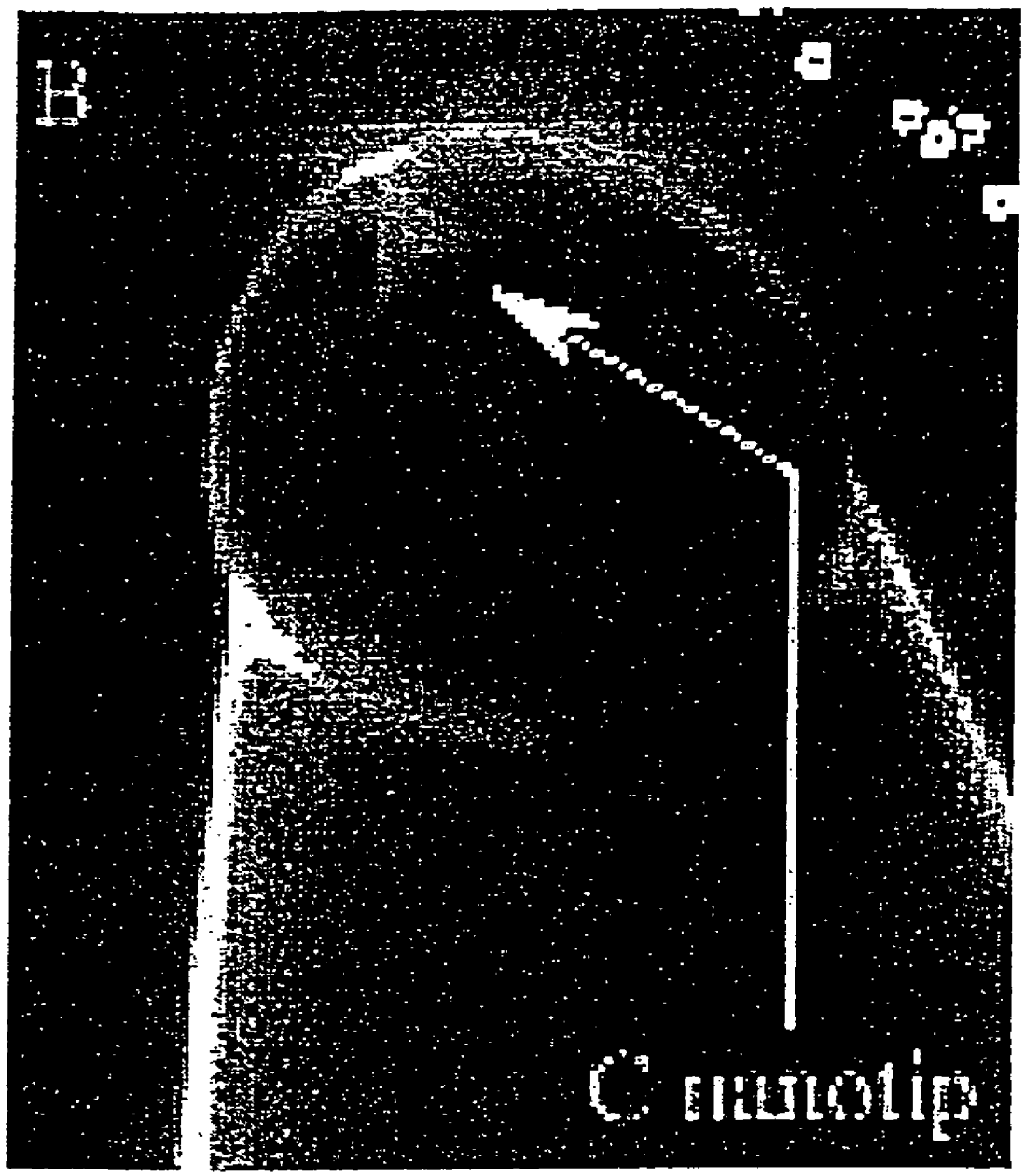
FIG. 10 is a an image of a carbon nanotip on the end of a tungsten needle.

It is also possible to fabricate a smaller tip on the end of a larger tip or needle. In the publication by S. D. Johnson et al. ("Carbon Nanotips for Field-Emission Electron Guns" Abstracts of the 47$^{th}$ International Conference on Electron, Ion and Photon Beam Technology and Nanofabrication, Tampa, Fla., May 27-May 30, 2003, p 274), a carbon nanotip is grown on the end of a tungsten needle. This is shown in FIG. 10.

Figure 11:
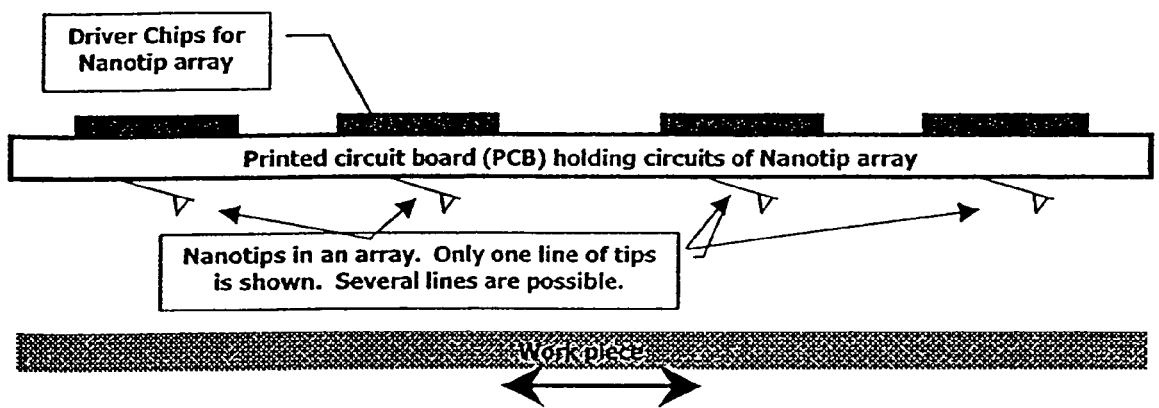
FIG. 11 is a representative side view of a nanospot welder.

Referring to FIG. 11, the nanospot welder may include one tip or a gang of tips on a single or multiple boards. The gang of tips can be in an array on a printed circuit board Each tip can be independently addressable in both gap (displacement) and/or voltage on the tip. Either one will regulate the current emitted from the tip. Driver chips mounted on the PCB can drive each tip individually or two or more in tandem. The PCB is displaced from the work piece by a small gap that is controlled by supports and actuators on the work piece and PCB (not shown). The PCB and/or the work piece can be moved relative to each other in order to allow the tips to address the full area of the work piece. Current is drawn from each of the tips by increasing the voltage to the tip of by changing the gap of the tip to the work piece. The gap between the work piece and each of the tips may be individually controlled.

Figure 12:
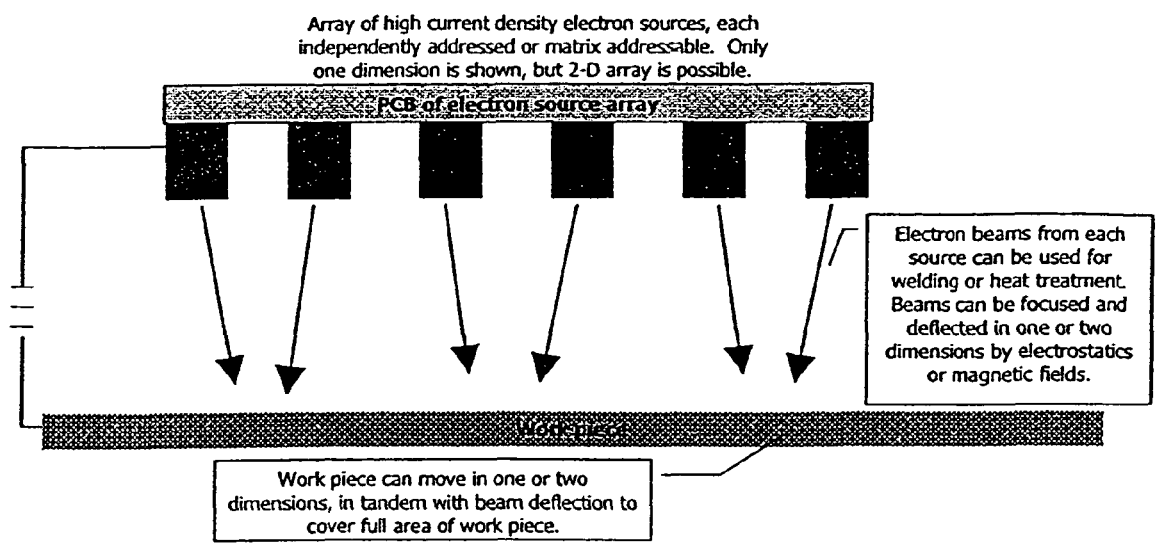
FIG. 12 is a representative view of another embodiment of a nanospot welder utilizing a multiple electron beam.

FIG. 12 is a representative view of another embodiment of the nanospot welder of the present invention. This embodiment of the nanospot welder includes a multiple electron beam. In this embodiment, several electron beams are used to provide heat treatment or to perform welding tasks. Typically, the beams would be in an array. The current and voltage of each beam may be independently controlled although the typical mode of operation would be to keep the beam voltage the same for each and modulate the current of each beam as a function of time and position of the beam on the work piece.

Figure 13:
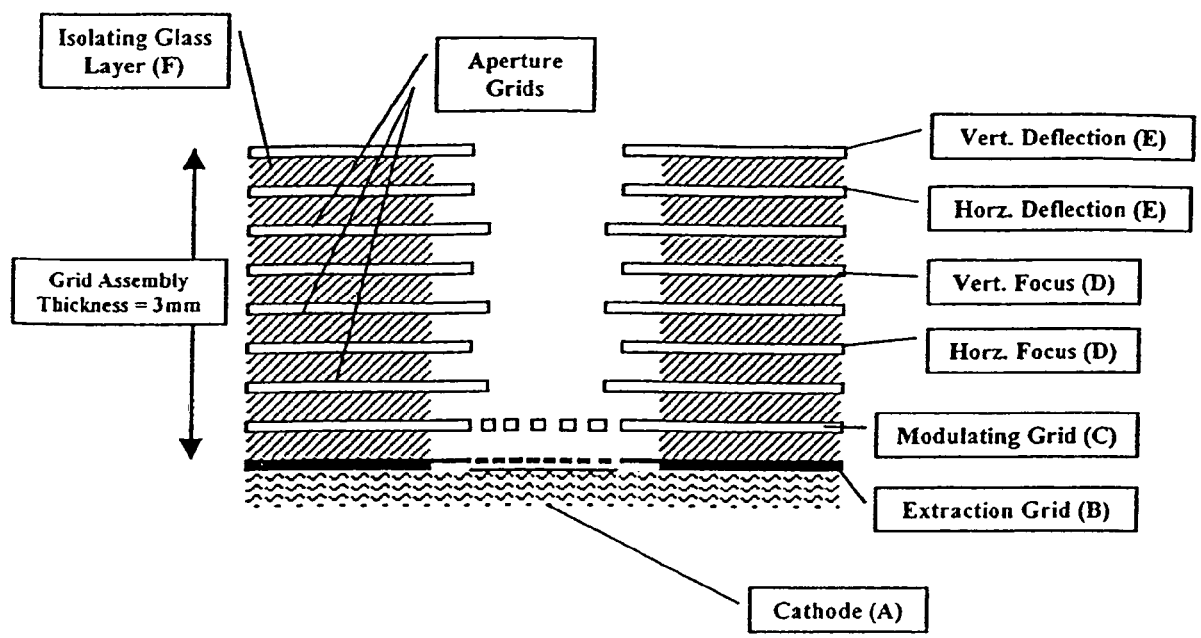
FIG. 13 is a representative cross-sectional view of a gated CNT electron source.

The beam current can be modulated by a control or extraction grid over the cathode. The cathode can be thermal (hot cathode) or cold (microtips or carbon nanotubes or photocathodes). The beam currents can also be pulse-width modulated to control the duty factor of the beam ON time. The electron source may be a hopping electron cathode using either a thermal electron source or a cold electron source (including carbon nanotubes) to achieve electron source current densities as high as 15 Amps/cm$^2$ or higher. The position of each beam can be controlled by electrostatic deflection. An example of such a structure for a display application is shown in FIG. 13, which also shows electrostatic focusing of the electron beam. A similar approach was taken for a display device was recently disclosed in "Flat CRT Display" and is incorporated into this disclosure by reference to U.S. Pat. No. 6,411,020 and PCT/US99/01841—WO 99/39361. The beam focus can be controlled by the relative potential applied to focus electron and aperture electrodes relative to the cathode and extraction grids.

The beams can also be controlled (deflected and focused) using magnetic fields. This is not shown, but similar methods are used to control the electron beams in cathode ray tubes (CRTs) used as TVs, scanning electron microscopes and multiple-beam and projection e-beam lithography approaches (e.g., DiVa approach of Timothy Groves: T. R. Groves and R. A. Kendall; Journal of Vacuum Science and Technology, B16 (6), November 1998, p. 3168). Using a magnetic field parallel to the directed electron beams as in the DiVa approach allows one to focus the beams to very small spots (sub-micron) at periodic distances away from the source without using electrostatic lenses, making the system fabrication much more simple. The magnetic fields can be generated using standard electro-magnets in a Helmholz coil configuration as described in most elementary physics texts. It is also possible in the embodiments to move the work piece during the welding process. The movement can be continuous or stop-and-go, depending on the application.

Yet another approach to making a nanospot welder is to use an electron gun with a concentrator of electrons utilizing a mechanism of electrons hopping over the surface of a funnel-shaped or tapered hole made in a dielectric, where the electron drift toward the hole outlet is maintained by applying an electric field oriented along the axis of the hole. Prior art of such an electron gun design includes, for example, Patent Applications US 2002/0053867, WO 00/79558, and WO 01/26131.

Figure 14:
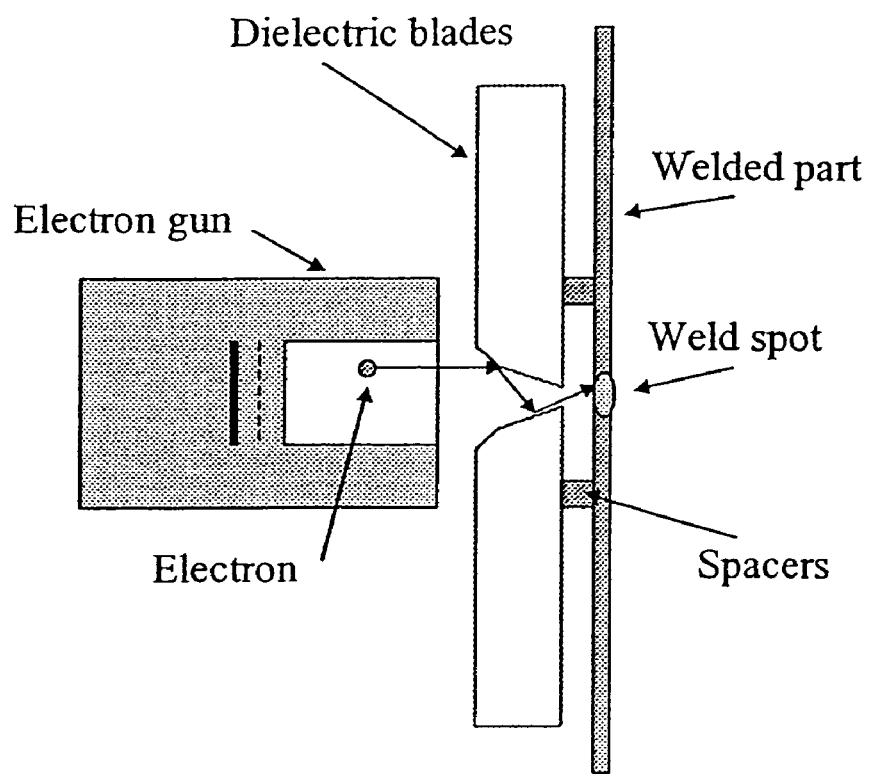
FIG. 14 is a representative view of another embodiment of the present invention.

Referring to FIG. 14, the electric field is induced by applying a potential to a welded part that becomes an accelerating electrode and a target at the same time. The energy of electrons is determined by the potential on the target. It is possible to bring the target temperature to a melting point or adjust the target temperature either by changing the electron beam current, target potential, or use pulse-width or pulse frequency modulation. More specifically, it is possible to bring the target temperature to a specified value by making a certain number of electron beam pulses.

Since the electrons diverge as they exit the hole, it is necessary either to place the welded part close to the hole outlet or use focusing electrodes. FIG. 14 depicts a concept where no focusing electrodes are used, and spacers are used to ensure that melted metal does not interfere with the dielectric concentrator. The concentrator may have the hole of any geometrical shape, e.g., cone, square pyramid, or rectangular pyramid.

Figure 15:
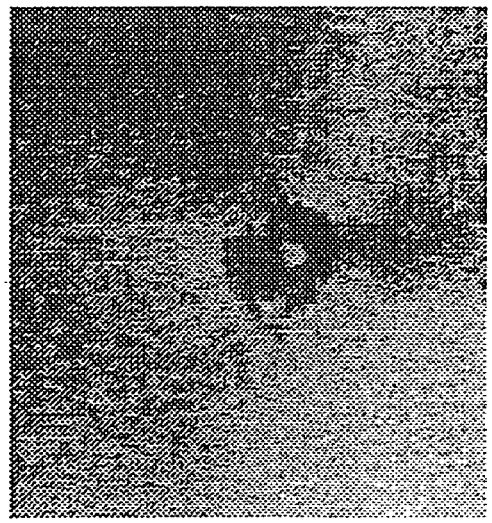
FIG. 15 is an image of a result of using an embodiment of the present invention.

A part of the welder is an electron gun. The electron gun is a source of electrons, and it may be a gated source. It may be either a thermionic cathode or cold cathode that uses field emission of electrons. In the described embodiment, a gated carbon nanotube cold cathode was used, which was capable of reaching up to 1 Amp/cm$^2$ of electron current. With such an electron gun and a rectangular shaped hole in a ceramic electron concentrator, the effect of melting a metal foil was achieved where the welding spot has a diameter of nearly 50 microns. FIG. 15 shows the photograph of the foil with a spot of melted and then solidified metal.

The spot size that can be achieved depends on the design of the nanospot welder parts that, in turn, specifies an electron optics configuration. Also, the spot size can be changed by varying the hole exit size. It is possible to make the size of the hole outlet of sub-micron dimensions. As in previous two concepts, it is possible to move the work piece during welding in a certain manner, either stop-and-go or continuously.

This concept can take a multiple-beam approach as well. A welding array can utilize either one electron gun with a mosaic concentrator, where the electron beam will split over multiple concentrators, or a multiple gun-concentrator system. A mosaic concentrator for a single-gun design can be made of a single piece of dielectric, or a mosaic where seams between parts are made in such a way that they do not result in significant loss (or leak) of electron current. A multiple gun design is used where the beam configuration often needs to be changed, and/or the system is used for sub-millimeter (or larger scale), rather then sub-micron, welding.

From the foregoing detailed description of specific embodiments of the invention, it should be apparent that a nanospot welder and method that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method for creating a nanospot weld on a work piece comprising:
    positioning a tip of a modified atomic force microscope (AFM) at a controlled distance from the work piece, wherein a cantilever beam of the AFM has the tip configured as an electron beam source;
    activating the electron beam source to provide electrons directed towards the work piece by applying a controlled voltage potential to the electron beam source; and
    modulating the voltage potential of the electron beam source or the controlled distance of the tip from the work piece to cause controlled local heating of the work piece thereby creating the nanospot weld on the work piece.

2. The method of claim 1, wherein the tip is configured as a carbon nanotube (CNT) cathode.

3. The method of claim 1, wherein the AFM is one of an array of AFM devices positioned on a printed circuit board (PCB).

4. The method of claim 3, wherein the AFM devices are independently addressable in both the controlled distance and the controlled voltage potential applied to the electron beam source.

5. The method of claim 4, wherein driver chips supplying the voltage potentials applied to the electron beam sources are mounted on the PCB.

6. The method of claim 4, wherein the PCB is displaced from the work piece by a small gap controlled by supports and actuators.

7. The method of claim 6, wherein the PCB and/or the work piece are moved relative to each other to allow the tips to address a full area of the work piece.

8. The method of claim 1, wherein the positioning is adjusted to modify a size of the weld on the work piece.

9. A method for creating a nanospot weld on a work piece comprising:
    positioning a gated cathode CNT electron beam source proximate to the work piece;
    positioning a hopping electron cathode (HEC) between the electron beam source and at a controlled distance from the work piece;
    selectively activating the electron beam source to provide electrons directed towards the work piece by applying controlled voltage potentials to the gated cathode of the electron beam source, a grid electrode of the electron beam source, and to an electrode on a surface of the HEC nearest to the work piece; and
    modulating the controlled voltage potentials to cause controlled local heating of the work piece thereby creating the nanospot weld.

10. The method of claim 9, wherein the electron beam source is one of an array of electron beam sources.

11. The method of claim 10, wherein the HEC is one of an array of HEC devices each corresponding to one of the array of electron beam sources.

12. The method of claim 11, wherein each of the HEC devices have funnel-shaped collectors with a large diameter entrance of the collectors directed towards the electron beam sources and a small diameter exit of the collectors directed towards the work piece.

13. The method of claim 12, wherein the work piece is in a vacuum chamber and the HEC devices are positioned and sealed such that the exit of the collectors extends into the vacuum chamber, and the entrance of the collectors extends outside the vacuum chamber.

\* \* \* \* \*